United States Patent [19]
Farr

[11] 4,113,317
[45] Sep. 12, 1978

[54] BRAKE PRESSURE REDUCING CONTROL VALVE

[75] Inventor: Glyn Phillip Reginald Farr, Birmingham, England

[73] Assignee: Girling Limited, Birmingham, England

[21] Appl. No.: 782,938

[22] Filed: Mar. 30, 1977

[30] Foreign Application Priority Data

Mar. 30, 1976 [GB] United Kingdom ............... 12768/76
Aug. 12, 1976 [GB] United Kingdom ............... 33688/76

[51] Int. Cl.² .............................................. B60T 8/26
[52] U.S. Cl. ................. 303/6 C; 137/505.18; 188/349; 303/22 R
[58] Field of Search ................. 303/6 C, 6 R, 22, 84, 303/24; 188/349, 195; 137/505.18, 472; 60/561

[56] References Cited

U.S. PATENT DOCUMENTS

| 3,088,285 | 5/1963 | Giacosa et al. ...................... 303/6 C |
| 3,258,924 | 7/1966 | Stelzer ............................. 303/6 C X |
| 3,532,390 | 10/1970 | Bueler ................................. 303/6 C |
| 4,008,925 | 2/1977 | Young ............................... 188/349 X |

Primary Examiner—Trygve M. Blix
Assistant Examiner—Douglas C. Butler
Attorney, Agent, or Firm—Scrivener, Parker, Scrivener & Clarke

[57] ABSTRACT

A pressure reducing valve for a vehicle braking system, comprises an inlet and an outlet communicating with each other through a radial port, and an elastomeric seal movable relative to the port between a closed position in which the seal covers the port and an open position. The seal is arranged to cover the port on the outlet side thereof so that the interface between the seal and the port is subjected to inlet pressure.

12 Claims, 5 Drawing Figures

BRAKE PRESSURE REDUCING CONTROL VALVE

This invention relates to pressure reducing valves for use in vehicle braking systems.

Such valves are commonly inserted in the brake pressure line between the pressure source, usually a master cylinder, and one or more wheel brakes, usually the rear wheel brakes, to reduce the braking effort of the rear brakes as compared to the front brakes and thereby reduce the risk of wheel lock.

In known valves communication between an inlet and an outlet is controlled by operation of an internal valve set including an elastomeric seal and a piston, movement of the piston effecting closure of the valve set. Differential pressure forces act on the piston so that as the inlet pressure increases the valve set opens and closes repeatedly with the result that pressure fluid passing to the outlet is metered, the outlet pressure being less than the inlet pressure.

Previously proposed reducer valves have the problem that there has been a tendency, in the closed condition of the valve, for the seal to be urged into the opening which it closes because of the pressure differential between the inlet and outlet. This occurs on each occasion the valve set is closed and can cause damage to the seal. Because of the many repeated valve operations, the life of the seal may be considerably affected.

The present invention aims to overcome the above-mentioned problem and provides a pressure reducing valve for a vehicle braking system, comprising an inlet and an outlet communicating with each other through a radial port, and an elastomeric seal movable relative to the port between a closed position in which the seal covers the port and an open position, wherein the seal is arranged to cover the port on the outlet side thereof so that the interface between the seal and the port is subjected to inlet pressure.

Some forms of pressure reducer valves in accordance with the invention will now be described, by way of example, with reference to the accompanying drawings, in which.

In each of the embodiments described below corresponding parts have been given the same reference numerals.

Figure 1:
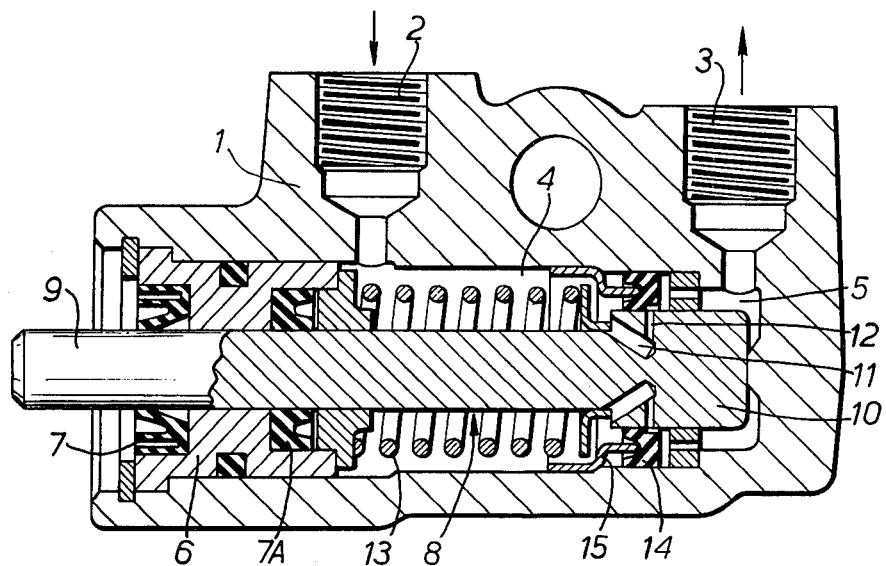
FIG. 1 is an axial cross-section of a first form of valve.

The valve shown in FIG. 1 comprises a housing 1 having an inlet 2 and and outlet 3 communicating with opposite ends of a valve bore 4, blind at one end adjacent an outlet chamber 5 and closed at the other by a sealed plug 6 supporting a pair of piston seals 7,7A. A stepped valve piston 8 has a stem 9 extending through the seals 7,7A and a head 10 formed with axially inclined passages 11 leading to radial ports 12. The piston 8 is urged by a pre-stressed coil compression spring 13 towards the outlet end of the valve bore 4.

Stationarily mounted about the head 10 is an annular seal 14 of elastomeric material which sealingly engages the head to the inlet side of the ports 12. The inner surface of the seal is relieved over an axial end portion which normally surround the ports 12. The seal is held in position by a retaining ring 15 which makes a tight, interference fit in the bore 4.

Figure 1A:
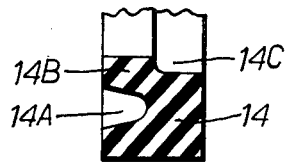
FIG. 1A is a detail cross-sectional view on a larger scale of a valve seal of FIG. 1.

As best seen in FIG. 1A, the seal 14 is grooved at 14A to receive the retaining ring 15 and also to render more flexible a sealing lip portion 14B, which constitutes the operative portion of the seal, adjacent the relieved portion 14C.

In operation, pressurised liquid from a master cylinder is supplied to the inlet and flows freely through passages 11, ports 12 and outlet chamber 5 to the outlet 3 until the out-of-balance pressure acting on the effective area of stem 9 is sufficient to overcome the force of the spring 13, to move the piston leftwards until the ports 12 are covered and closed by the seal lip or valve-closing portion 14B.

At this stage, the seal is subjected to equal pressures from both sides and the inlet pressure acting through the ports 12 resists the seal material being forced into the ends of the ports. As inlet pressure continues to increase, it acts on the piston step to urge it to the right, uncover the ports 12 again and to permit more flow through the valve to the outlet 3. This closing and opening action is repeated while the inlet pressure increases to meter liquid through the valve so that the outlet pressure increases at a reduced rate relative to the inlet pressure. Throughout this operation, inlet pressure acts in the recess 14A and thus tend to counterbalance the inlet pressure acting through the port 12 outwardly on the lip 14B.

When the inlet pressure is relieved, but does not fall below the outlet pressure, the piston moves to the left to increase the volume of the output chamber and thereby reduce the outlet pressure to restore the balance of forces acting on the piston 10. If the inlet pressure falls to a value below the outlet pressure liquid forces its way past the relieved portion 14C of the seal 14 and deflects the lip 14B of the seal away from the piston to permit return flow of pressure fluid to the inlet with an attendent drop in the outlet pressure. The spring 13 is effective, if the inlet pressure decreases sufficiently to return the piston to the right so that ports 12 are exposed and the passages 11 and ports 12 once again freely communicate the outlet chamber 5 and inlet.

It will be seen that the seal is not subjected at any stage to large pressure differentials and that at all times when the piston head is sliding through the seal, any tendency for the seal material to be damaged by attrition is offset by the fact that the interface between the ports 12 and the seal is subjected to the inlet pressure acting through ports 12 which urges the seal material away from the ports and not into them.

Figure 2:
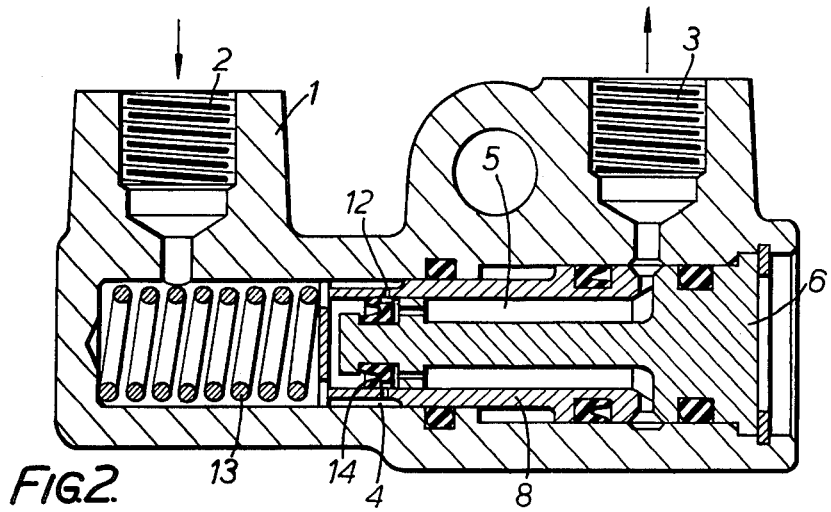
FIG. 2 is an axial cross-section of a second form of valve.

In the embodiment of FIG. 2, the general construction and operation of the valve are the same as for that of FIG. 1. The principal difference is that the piston 8 is of tubular form and the seal 14 is arranged to seal against the internal face of the piston 8. The seal is mounted on a stem extension of the closure plug 6 of the valve.

Figure 3:
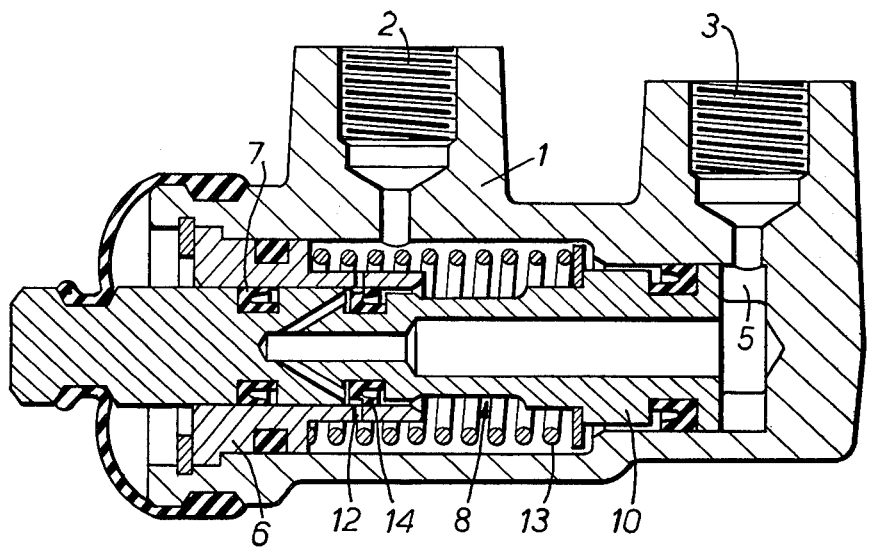
FIG. 3 is an axial cross-section of a third form of valve.

In the embodiment of FIG. 3, the general construction and operation of the valve are the same as for that of FIG. 1, the principal difference being that the piston 8 is of tubular form and the seal 14 is arranged in a groove in the piston stem 9 for co-operation with ports 12 formed in a tubular shroud extension of the closure plug 6 of the valve. Thus, the ports 12 are stationary and the seal 14 is movable with the piston 8.

In a dual circuit braking system, the piston 8 of the above described valves could be subjected to a larger disabling force, through stem 9 in FIGS. 1 and 3, in response to pressure loss in one circuit in order to prevent closure of the reducer valve.

Figure 4:
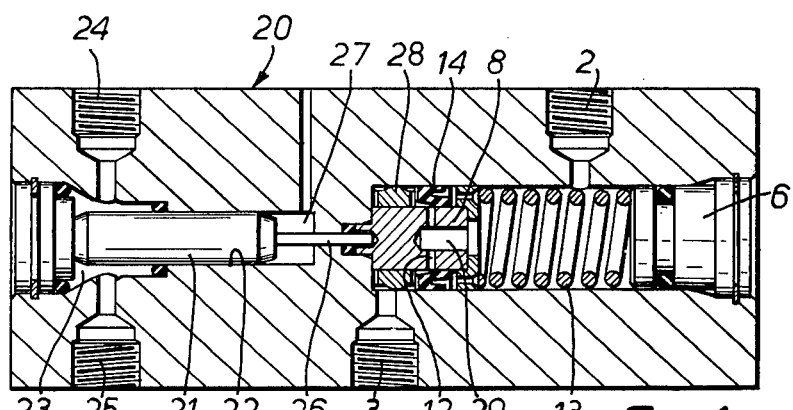
FIG. 4 is an axial cross-section of a fourth form of valve incorporating a disabling device.

The reducer valve of FIG. 4 includes the disabling device 20 which is similar to the device illustrated and described in my U.S. Pat. No. 3,976,334 to which attention is directed. Briefly, the device comprises a member 21 sealingly slidable in a bore 22 and subjected at one end to the pressure in a chamber 23 having an inlet 24, connected to the same pressure source as the inlet 2, and an outlet 25. The other end of the member 21 abuts an extension 26 of the piston 8 in a vented passive space 27. The extension 26 is secured to the piston 8 in any suitable manner.

The valve is otherwise generally similar to that of FIG. 1, the other principle differences being that the piston 8 is guided by a support 28 having circumferentially spaced projections around its periphery to allow the passage of fluid therebetween and that the ports 12 are connected to an axial bore 29 in the piston 8.

In use, under normal operating conditions, pressure fluid flows freely from both inlets 2 and 24 to the respective outlets 3,25. The effect of pressure on the small diameter of extension 26 is relatively small and may be ignored, so that the pressure force on piston 8 is balanced, but the pressure acting on member 21 is counteracted by the spring 13. When the pressure in the inlets reaches a predetermined level, the piston 8 and member 21 move to the right, against the action of the spring, to close the valve.

Any further increase in pressure at the inlet 2 now acts over the sealed area of piston 8 in a sense to return the piston 8 to the left and is opposed by the increased pressure acting over the smaller area of the member 21, assisted by the pressure prevailing at the outlet 3 at the time of initial closure acting on the sealed area on the outlet side of the piston 8. This imbalance causes the piston to return to the right to re-open the valve, and meter pressure fluid through to the outlet at a reduced rate, relative to the rate of pressure increase at the inlet.

It will be readily understood that failure of the front line pressure fed to inlet 24 will remove the hydraulic thrust on member 21 which is required to effect initial closure of the valve, which will therefore remain open to transmit all available pressure to the outlet 3.

In all of the above-described embodiments inlet pressure acts essentially on the sealing surface of the seal, tending to deflect it away from the ports 12.

In all cases, the valve is shown with a preset internal spring 13 to determine the pressure at which the valve initially closes, but it will be evident to those skilled in the art that the valve piston could be subjected to an external force, such as a variable spring force proportional to the rear axle loading of the vehicle in question, applied to the piston 8, via the externally projecting portion of the stem 9 in the embodiments of FIGS. 1 and 3.

It will be appreciated that the seal 14 may take other forms. For example, instead of an annular recess surrounding the ports 12, the seal may have in the seal portion 14C surrounding the ports a plurality of axial recesses separated by circumferentially spaced lands which support the seal in the region of the ports 12. The number of lands and ports 12 are so chosen that in the open condition of the valve at least one port will be open.

I claim:

1. A pressure reducing valve for a vehicle braking system, comprising a housing having an inlet and an outlet, differential area means in said housing subject to inlet and outlet pressures and arranged to provide a pressure at said outlet reduced from the pressure at said inlet, means defining a radial port having an inlet end in permanent communication with said inlet and an outlet end communicating with said outlet, and an elastomeric seal movable relative to said port between a closed position in which said seal covers said port and an open position, wherein in said closed position said seal is arranged to cover the port at the outlet end thereof and the interface between said seal and said port is at all times subjected to inlet pressure.

2. A pressure reducing valve according to claim 1, wherein said seal includes a valve closing portion which in the closed position covers said port and means defining a recess radially spaced from said closing portion and subjected to inlet pressure, whereby said closing portion is substantially pressure balanced in said closed position.

3. A pressure reducing valve according to claim 1, wherein said seal includes a portion having means defining a recess which is adjacent said port in said open position.

4. A pressure reducing valve according to claim 3, wherein said recess is an annular recess.

5. A pressure reducing valve according to claim 1, wherein said outlet end of said port opens on the outlet side of said seal in the open position.

6. A pressure reducing valve according to claim 1, wherein said seal is stationary.

7. A pressure reducing valve according to claim 6, including a movable piston in which said port is formed, said piston co-operating with said seal.

8. A pressure reducing valve according to claim 7, wherein said seal surrounds said piston.

9. A pressure reducing valve according to claim 7, wherein said piston includes means defining an internal bore within which said seal slides.

10. A pressure reducing valve according to claim 1, wherein said port is stationary and said seal is movable.

11. A pressure reducing valve according to claim 10, including a cylindrical member in which said port is formed and a piston on which said seal is mounted, said piston being slidable within said cylindrical member.

12. A pressure reducing valve according to claim 1, including a disabling device for connection to a separate braking circuit, said disabling device being adapted to prevent operation of said valve in the event of failure of said separate circuit.

* * * * *